Figure 2:
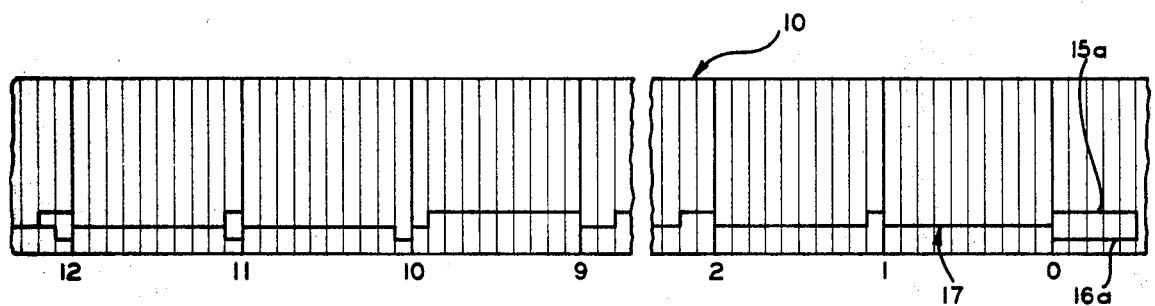

United States Patent [11] 3,611,404

[72] Inventor William N. Doggett
 Bartlesville, Okla.
[21] Appl. No. 37,766
[22] Filed May 15, 1970
[45] Patented Oct. 5, 1971
[73] Assignee Phillips Petroleum Company

[54] MARKING TIMING INDICIA ON A RECORDING MEDIUM
10 Claims, 7 Drawing Figs.
[52] U.S. Cl. .................................................. 346/1,
 346/23, 346/49, 346/109
[51] Int. Cl. .................................................. G07c 1/10
[50] Field of Search ........................................ 346/23, 45,
 49, 66, 109, 1

[56] References Cited
UNITED STATES PATENTS
2,976,104 3/1961 Petersen .................... 346/49 X
3,409,895 11/1968 Hayden ...................... 346/49 X
3,454,953 7/1969 Lloyd et al. ................. 346/23

Primary Examiner—Joseph W. Hartary
Attorney—Young and Quigg

ABSTRACT: In order to identify timing lines on a recording medium, marks are made by two recording elements such as galvanometers. The deflections of the elements are regulated so that a coded timing pattern is recorded.

INVENTOR.
W. N. DOGGETT
BY Young & Quigg
ATTORNEYS

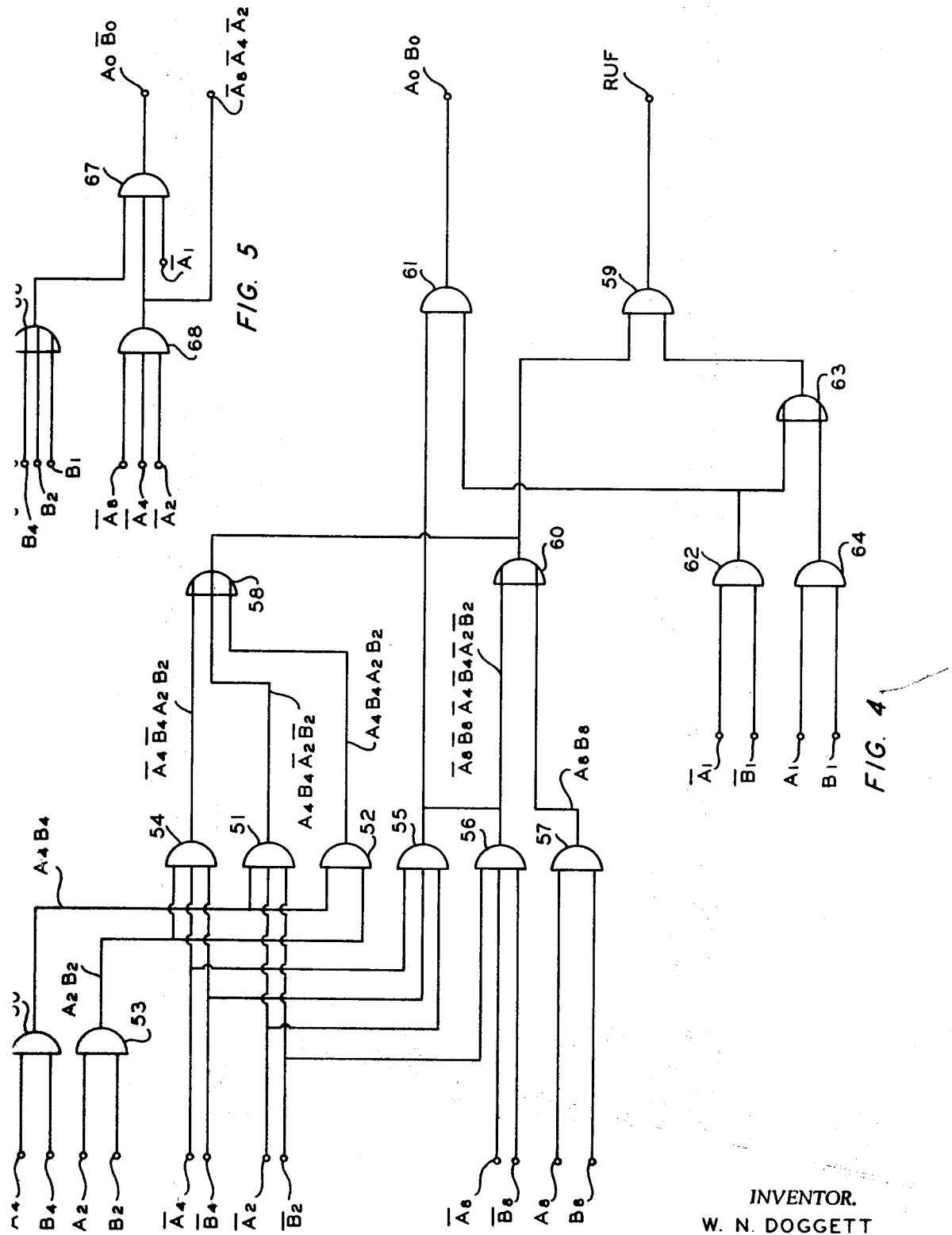

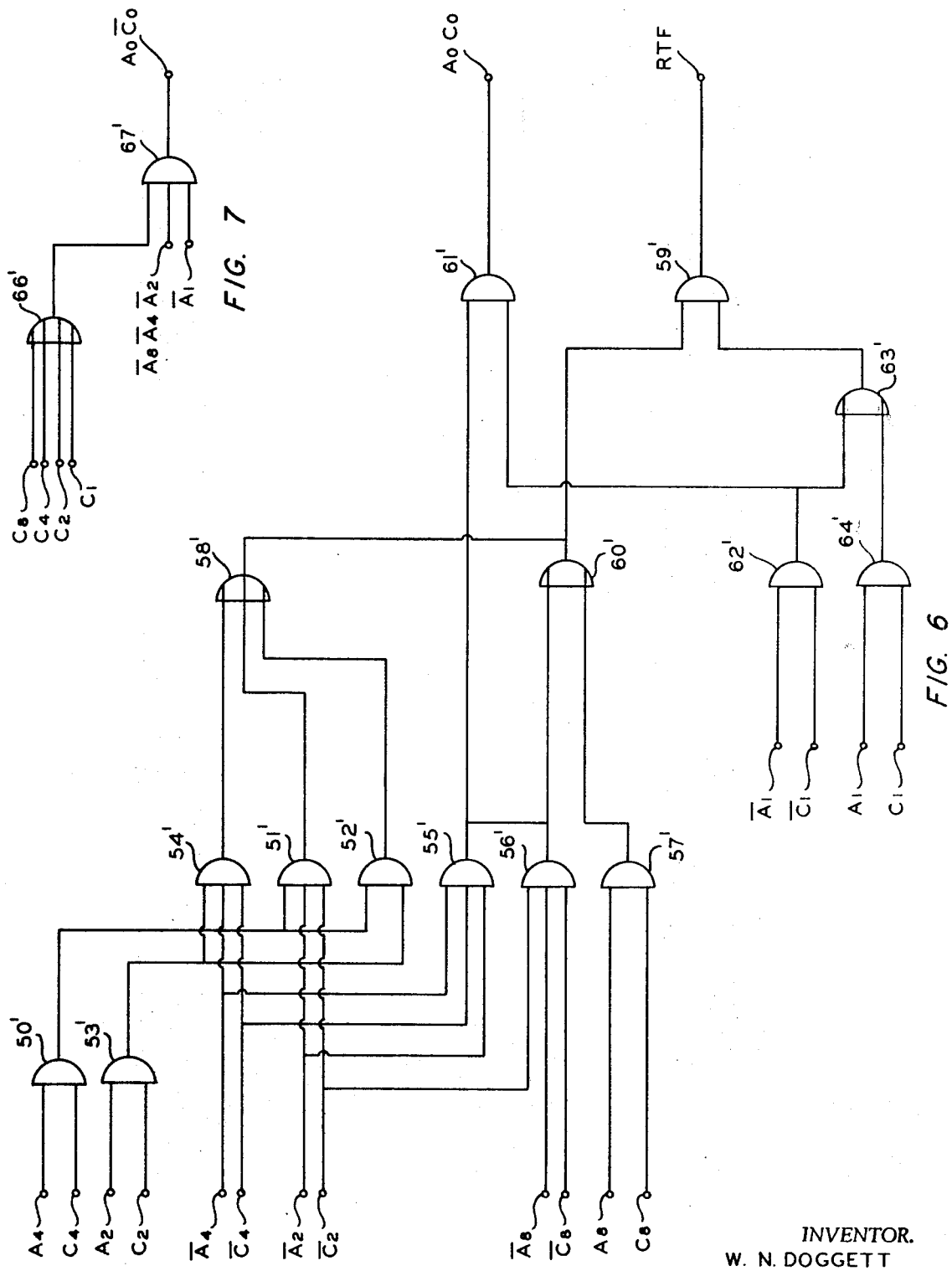

MARKING TIMING INDICIA ON A RECORDING MEDIUM

In various types of recording systems, timing lines are printed on the recording medium in order to facilitate interpretation of the records. One such example occurs in seismic prospecting wherein the outputs of a number of seismometers are recorded simultaneously in side-by-side relationship on an optically sensitive film. Timing lines are also recorded on the film so that the times of occurrence of seismic reflections can be observed and compared. One common practice is to record a relatively thin line every 10 milliseconds and a thicker line every 100 milliseconds. Since the recorded signals may extend over a period of several seconds, it is desirable to number the timing lines so that the times of reflections can readily be measured. This has usually been accomplished heretofore by photographically printing numerals on the recording medium. An opaque strip of material having spaced openings in the form of consecutive numerals is positioned between a light source and the recording medium. This strip is moved at the speed as the recording medium so that light shining through the spaced openings prints the numerals on the medium adjacent the heavy timing lines.

Timing line marking apparatus of this type is not entirely satisfactory in commercial operations. Unless the opaque strip is moved at exactly the same speed as the recording medium, the printed numerals will not be in correct alignment with the timing lines. There is also a danger that the strip may break during a recording operation. Moreover, mechanical devices of this type are difficult to maintain in proper galvanometer condition, particularly in field operations.

In accordance with an embodiment of this invention, a pair of line displacements are optically recorded to identify the timing lines on a recording medium. This is accomplished by a pair of recording galvanometers which are positioned adjacent one another along the edge of the recording medium. One galvanometer records a trace either along a base line or displaced therefrom in a first direction. The second galvanometer records a trace either along the base line or displaced therefrom in the opposite direction. The galvanometers reflect beams of light from suitable lamps onto the recording medium to provide the marking indicia.

Means are provided for actuating the two galvanometers in a coded manner so that the recordings of the two galvanometers provide an identification of the timing lines. An electrical circuit employed to actuate the galvanometers can be controlled by the circuit that energizes the timing line marking means so that the galvanometer displacements are coordinated with the timing lines.

Figure 1:
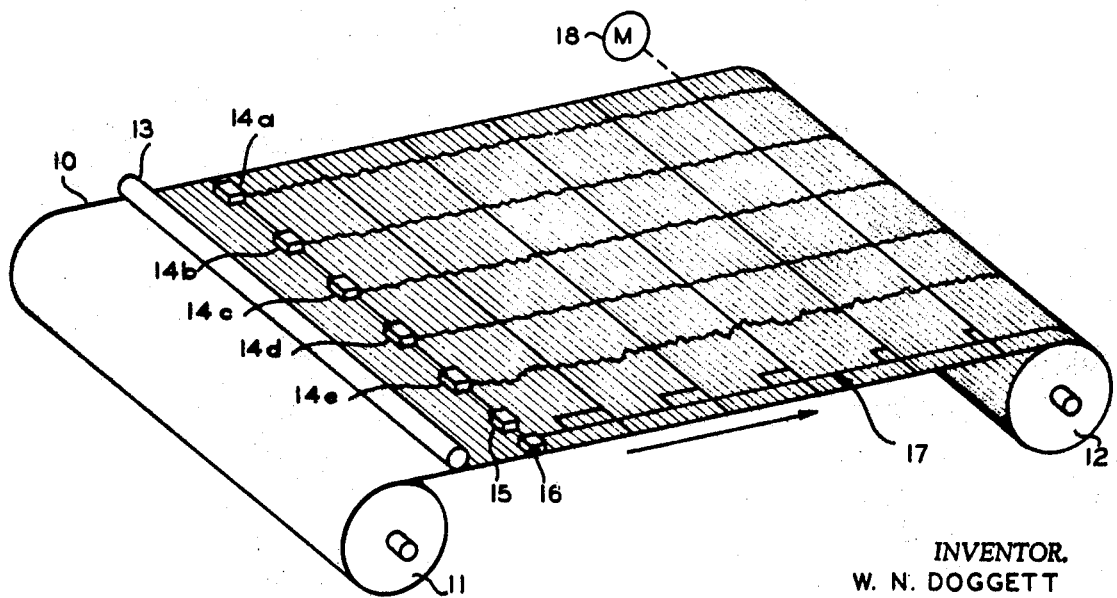
Figure 3:
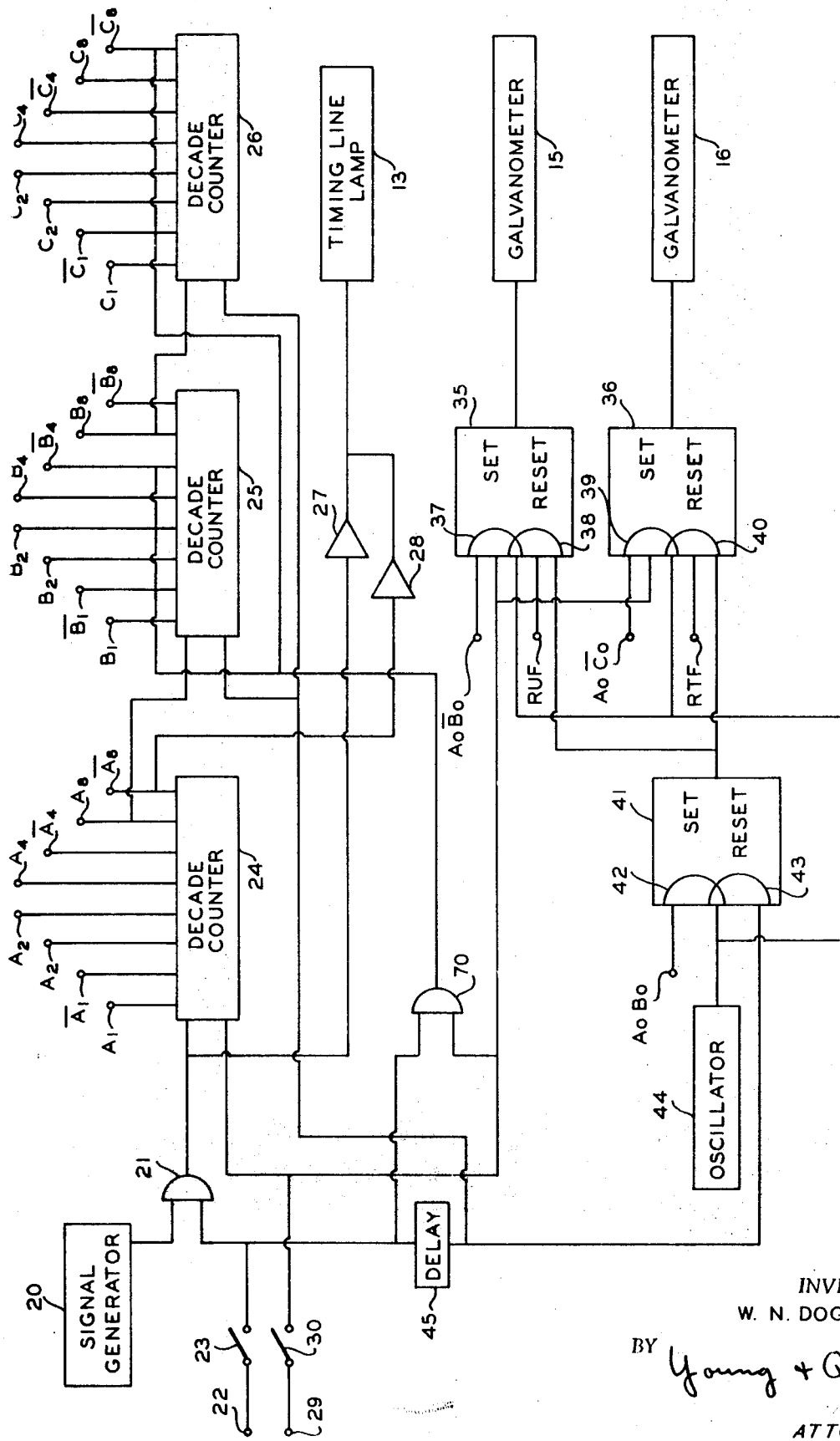

In the accompanying drawing, FIG. 1 is a schematic representation of a recording system having the timing line identification apparatus of this invention incorporated therein. FIG. 2 illustrates a timing line identification of the type produced by the apparatus of this invention. FIG. 3 is a schematic circuit drawing of apparatus employed to actuate the recording galvanometers of FIG. 1. FIGS 4 to 7 are schematic circuit drawings of control apparatus which is actuated by the output signals of the decade counters of FIG. 3.

Referring now to the drawing in detail and to FIG. 1 in particular, there is shown an optically sensitive strip of recording material 10 which extends from a supply roll 11 to a takeup roll 12. Takeup roll 12 is driven by a motor 13. A lamp 15 is spaced above recording material 10 to record a series of timing lines when the lamp is energized. A mask having a narrow slit therein, not shown, is normally positioned between lamp 13 and film 10 so that the relatively narrow transverse timing lines are formed on the recording material. A series of recording galvanometers 14a, 14b... 14e are positioned above recording material 10 to provide traces representative of signals to be recorded. The apparatus thus far described constitutes a conventional recording system of the type used to record seismic records, for example.

In accordance with this invention, recording galvanometers 15 and 16 are positioned adjacent one another along the edge of the recording material so that a timing line identification trace 17 is recorded. Galvanometer 15 records a longitudinally extending line 15a, and galvanometer 16 records a longitudinally extending line 16a. In the absence of these galvanometers being energized, the recorded lines are superimposed, as illustrated between timing lines "o" and "1". When galvanometer 15 is energized, line 15a is deflected upwardly, as illustrated immediately following timing line "1". When galvanometer 16 is energized, line 16a is deflected downwardly, as illustrated immediately following timing line "10".

The electrical circuit employed to actuate lamp 13 and recording galvanometers 15 and 16 is illustrated in FIG. 3. This apparatus comprises a signal generator 20 which provides a generally square wave signal at a frequency of 100 cycles per second. The output signal of generator 20 is applied to the first input of a gate 21 which constitutes an AND circuit. A terminal 22, which is connected to a voltage source, not shown, is connected to the second input of gate 21 when a switch 23 is closed. Closure of switch 23 thus applies the 100 cycles per second signal from generator 20 to a first decade counter 24 and through a pulse generating amplifier 27 to timing line lamp 13. Thus, lamp 13 is energized briefly each 10 milliseconds to produce a timing line on recording medium 10. At the end of each 100 milliseconds a second pulse is applied to lamp 13 from a pulse-generating amplifier 28. The duration of the pulse supplied by amplifier 28 is slightly longer than that of the pulse from amplifier 27 so that every tenth timing line is heavier, as illustrated in FIG. 2. Amplifier 28 is energized by output signals from decade counter 24. The circuit of FIG. 3 includes additional decade counters 25 and 26 to control galvanometers 15 and 16 in the manner to be described. A terminal 29 is connected to a source of reset potential, not shown. When a switch 30 is closed this reset potential is applied to decade counters 24, 25 and 26 to reset the counters.

Recording galvanometer 15 is controlled by a flip-flop circuit 35. This circuit can comprise a bistable multivibrator which is set by an AND circuit 37 and reset by an AND circuit 38. Similarly, galvanometer 16 is controlled by a flip-flop circuit 36 which is set by an AND circuit 39 and reset by an AND circuit 40. Each of these AND circuits has three inputs. The output of an oscillator 44 is connected to each of the AND circuits. This oscillator has a frequency which is relatively high compared to the frequency of signal generator 20 and serves to prevent transient signals from producing erroneous outputs. Circuits 35 and 36 can operate only when a pulse is received from oscillator 44. A third flip-flop circuit 41 is provided with an AND set circuit 42 and an AND reset circuit 43. The output of circuit 41 is connected to the reset circuits of flip-flops 35 and 36. The flip-flop circuits of FIG. 3 are controlled by signals from the logic circuits illustrated in FIGS. 4 to 7. These logic circuits, in turn, are controlled by the output signals of decade counters 24, 25 and 26.

Each of the decade counters of FIG. 3 comprises four bistable multivibrators which are connected to provide output signals in binary form. These output signals are in pairs and are designated by terminals such as $A_1$, $\bar{A}_1$, $A_2$, $\bar{A}_2$, $A_4$, $\bar{A}_4$, $A_8$ and $\bar{A}_8$ of counter 24. Similar B and C output signals are provided by respective counters 25 and 26. Counter 25 is energized by a signal from counter 24, and counter 26 is energized by a signal from counter 25. It should thus be apparent that the three series-connected counters are capable of counting up to 1,000.

As illustrated in FIG. 4, a first AND circuit 50 receives input signals $A_4$ and $B_4$. The output signal from circuit 50 is applied to first inputs of AND circuits 51 and 52. An AND circuit 53 receives input signals $A_2$ and $B_2$. The output of circuit 53 is applied to an input of circuit 52 and to an input of an AND circuit 54. Input terminal $\bar{A}_4$ is connected to an input of circuit 54 and an input of AND circuit 55. An input terminal $B_4$ is connected to an input of circuit 54 and an input of circuit 55. An input $\bar{A}_2$ is connected to an input of circuit 51 and an input of circuit 55. An input terminal $\bar{B}_2$ is connected to an input of circuit 51 and an input of an AND circuit 56. Input terminals $\overline{A}_8$ and $\overline{B}_8$ are connected to respective second and third inputs of circuit 56. Input terminals $A_8$ and $B_8$ are connected to respective inputs of an and circuit 57. The outputs of circuits 51, 52 and 54 are connected to an input of an OR circuit 58. The output of circuit 58 is connected to an input of an AND circuit 59. The outputs of circuits 56 and 57 are connected to the respective inputs of an OR circuit 60. The output of circuit 60 is also connected to the input of AND circuit 59. The outputs of circuits 55 and 56 are connected to the first input of an AND circuit 61. Input terminals $\overline{A}_1$ and $\overline{B}_1$ are connected to the respective inputs of an AND circuit 62. Input terminals $A_1$ and $B_1$ are connected to the respective inputs of an AND circuit 64. The outputs of circuits 62 and 64 are connected to the respective inputs of an OR circuit 63. The output of circuit 63 is connected to the second input of AND circuit 59. The output of circuit 62 is also connected to the second input of circuit 61.

The output signal from AND circuit 61, which is represented by $A_oB_o$ is applied to one of the inputs of AND circuit 42 of FIG. 3. The output of AND circuit 59, which is designated RUF, is applied to one of the inputs of AND circuit 38 of FIG. 3.

Input terminals $B_1$, $B_2$, $B_4$ and $B_8$ of FIG. 5 are connected to the respective inputs of an OR circuit 66. The output of circuit 66 is connected to the first input of an AND circuit 67. Input terminals $\overline{A}_2$, $\overline{A}_4$ and $\overline{A}_8$ are connected to the respective inputs of an AND circuit 68. The output of circuit 68 is connected to the second input of circuit 67 and to a terminal $\overline{A}_8\overline{A}_4\overline{A}_2$. A terminal $\overline{A}_1$ connected to the third input of AND circuit 67. The output of circuit 67, which is designated $A_o\overline{B}_o$, is connected to an input of AND circuit 37 of FIG. 3.

Output signals from the several AND and OR circuits in FIGS. 4 and 5 are designated in the drawing by appropriate symbols. For example, the output signal from AND circuit 50 is designated $A_4B_4$. This is indicative of the fact that an output signal appears only when both inputs $A_4$ and $B_4$ are applied to circuit 50. The output signal from OR circuit 66 in FIG. 5 is designated $B_1+B_2+B_4+B_8$. This is indicative of the fact that an output signal appears when any one of the input signals is present, not that the signal is the sum of the terms.

The actual circuit of FIG. 6 is identical to that of FIG. 4 and corresponding elements have been designated by like primed reference numerals. However, the circuit of FIG. 6 differs from the circuit of FIG. 4 in that different input signals are received, as illustrated. The output signal $A_oC_o$ from AND circuit 61' is applied to AND circuit 39 of FIG. 3. The output signal RTF from AND circuit 59' is applied to AND circuit 40 of FIG. 3.

Input terminals $C_1$, $C_2$, $C_4$ and $C_8$ are connected to the respective inputs of an OR circuit 66' in FIG. 7. The output signal from this circuit is applied to the first input of an AND circuit 67'. Terminal and terminals constitute the second and third inputs of AND circuit 67. The output signal $A_o$ from circuit 67' is connected to one input of AND circuit 39 in FIG. 3.

At the beginning of a recording cycle, switches 23 and 30 of FIG. 3 are closed. The potential of terminal 29 is applied to reset counter 24, and the potential of terminal 22 is applied through a delay circuit 45 to reset counters 25 and 26. This delay circuit can constitute a one-shot multivibrator which incorporates a short delay. The output signal from delay circuit 45 is also applied to AND circuit 43. This serves to reset circuit 44 and to apply reset signals to circuits 38 and 40. The net result is to reset both galvanometers 15 and 16 to zero. The output signals from the decade counters of FIG. 3 actuate the logic circuits of FIGS. 4 to 7 so that the galvanometers are actuated to produce the timing identification lines illustrated in FIG. 2 of the drawing. Both galvanometers remain undeflected for a period of 100 milliseconds. At this time, galvanometer 15 is deflected for a period of 10 milliseconds. At the end of 200 milliseconds, galvanometer 15 is deflected for 20 milliseconds. At the end of 1,000 milliseconds, galvanometer 16 is deflected for 10 milliseconds. At the end of 1,300 milliseconds, galvanometer 15 is deflected for 30 milliseconds and galvanometer 16 is deflected for 10 milliseconds. The resulting galvanometer deflections permit the heavy timing lines of FIG. 2 to be identified positively in the manner illustrated. At the end of 2,000 milliseconds, galvanometer 16 is deflected for 20 milliseconds, etc. While recording galvanometers have been described for purposes of illustration, other recording elements such as marking pens can be employed.

In order to correlate the galvanometer deflections with the zero point on the recorder, the counters can be preset to a number other than zero, such as minus 3. This can be accomplished by the use of AND circuits such as 70 in FIG. 3 to apply potentials to selected terminals.

While this invention has been described in conjunction with a presently preferred embodiment, it should be evident that it is not limited thereto.

I claim:
1. The method of marking timing indicia on a recording medium comprising:
   actuating a first recording element periodically at a first frequency to mark on the recording medium, the durations of the actuations of said first recording element progressively increasing and then repeating at a second frequency, said first frequency being ten times greater than said second frequency; and
   actuating a second recording element to mark on the recording medium at times corresponding to predetermined actuations of said first recording element, the durations of the actuations of said second recording element progressively increasing at said second frequency.
2. The method of claim 1 wherein said second recording element is not actuated until the 10th actuation of said first recording element.
3. The method of claim 1, further comprising marking timing lines on said recording medium at said first frequency and synchronized with the actuations of said first recording element.
4. The method of claim 3, further comprising marking second timing lines on said recording medium at a frequency 10 times greater than said first frequency and synchronized with the actuations of said first recording element.
5. Apparatus for marking timing indicia on a recording medium comprising:
   a first recording element positioned adjacent a recording medium to mark thereon;
   means to actuate said first recording element periodically at a first frequency, the durations of said actuations increasing progressively and then repeating at a second frequency which is one-tenth as great as said first frequency;
   a second recording element positioned adjacent said recording medium to mark thereon; and
   means to actuate said second recording element at times corresponding to predetermined times at which said first recording element is actuated, the durations at which said second recording element are actuated progressively increasing at said second frequency.
6. The apparatus of claim 5 wherein said first and second recording elements are stationary and said recording medium is moved in a first direction relative to said recording elements, said first recording element is deflected in a second direction at right angles to said first direction when actuated, and said second recording element is deflected in a third direction opposite said second direction when actuated.
7. The apparatus of claim 6 wherein said recording medium is an optically sensitive material and said recording elements are recording galvanometers.
8. The apparatus of claim 5, further comprising a third recording element to mark timing lines on said recording medium, and means to actuate said third recording element at a third frequency which is 10 times greater than said first frequency.
9. The apparatus of claim 8 wherein said means to actuate comprise a signal generator to establish a first signal of said third frequency; means to apply said first signal to said third recording element; first, second and third decade counters connected in series; means to apply said first signal to said first counter; and means responsive to signals from said counters to actuate said first and second recording elements.

10. The apparatus of claim 8, further comprising means to apply an output signal from said first counter, which output signal has a frequency one-tenth the frequency of said first signal, to said third recording element.